United States Patent
Sun et al.

(10) Patent No.: US 12,416,705 B2
(45) Date of Patent: Sep. 16, 2025

(54) POSITION LOCKING METHOD OF UNDERWATER EQUIPMENT, TERMINAL EQUIPMENT, SYSTEM AND NON-TRANSITORY MEDIUM

(71) Applicant: SHENZHEN QYSEA TECH CO., LTD, Shenzhen (CN)

(72) Inventors: Wei Sun, Shenzhen (CN); Choju Chung, Shenzhen (CN); Chong Zhang, Shenzhen (CN)

(73) Assignee: SHENZHEN QYSEA TECH CO., LTD., Shenzhen (CN)

( * ) Notice: Subject to any disclaimer, the term of this patent is extended or adjusted under 35 U.S.C. 154(b) by 430 days.

(21) Appl. No.: 17/889,598

(22) Filed: Aug. 17, 2022

(65) Prior Publication Data

US 2023/0280441 A1 Sep. 7, 2023

(30) Foreign Application Priority Data

Mar. 4, 2022 (CN) .......................... 202210212066.1

(51) Int. Cl.
*B63G 8/00* (2006.01)
*G01S 5/16* (2006.01)

(52) U.S. Cl.
CPC ................ *G01S 5/16* (2013.01); *B63G 8/001* (2013.01); *B63G 2008/002* (2013.01); *G01S 2201/07* (2019.08)

(58) Field of Classification Search
CPC .............. B63G 2008/002; B63G 8/001; G01S 2201/07; G01S 5/16; G06F 18/214; G06N 3/04; G06N 3/08; Y02A 90/30

(Continued)

(56) References Cited

U.S. PATENT DOCUMENTS

2006/0008137 A1 1/2006 Nagahdaripour et al.

FOREIGN PATENT DOCUMENTS

| CN | 109856638 A | 6/2019 |
|----|-------------|--------|
| CN | 109859271 A | 6/2019 |

(Continued)

OTHER PUBLICATIONS

Gannon, Mary, et al. "Why Use Twisted Pair Cable vs. Coaxial Cable." Wire and Cable Tips, Aug. 19, 2015, www.wireandcabletips.com/when-should-i-use-twisted-pair-versus-coaxial-cables/#:~:text=This%20twisting%20helps%20to%20eliminate,long%20runs%20like%20coax%20cables. (Year: 2015).*

(Continued)

*Primary Examiner* — Lisa M Caputo
*Assistant Examiner* — Joshua L Forristall
(74) *Attorney, Agent, or Firm* — Westbridge IP LLC

(57) ABSTRACT

Disclosed are a position locking method of an underwater equipment, a terminal device, a system and a medium. The method comprises: acquiring an optical image and a sonar image taken by an underwater equipment; obtaining a target image by synthesizing the optical image and the sonar image, the target image including at least a target object; determining position offset information of the target object according to the target image; and generating position control parameters of the underwater equipment according to the position offset information, and sending position control parameters to the underwater equipment to make the underwater equipment to lock a position according to the position control parameters. The present application greatly reduces operation difficulty of the underwater equipment in turbid or undercurrent water areas.

6 Claims, 4 Drawing Sheets

(58) Field of Classification Search
USPC .......................................................... 702/150
See application file for complete search history.

(56) References Cited

FOREIGN PATENT DOCUMENTS

| CN | 109884642 | A |   | 6/2019  |            |
|----|-----------|---|---|---------|------------|
| CN | 110148178 | A | * | 8/2019  | G01P 15/18 |
| CN | 113252028 | A | * | 8/2021  |            |
| CN | 113739720 | A |   | 12/2021 |            |
| CN | 113781421 | A | * | 12/2021 | G06F 18/24 |
| CN | 114049549 | A |   | 2/2022  |            |
| WO | 2014173393| A1|   | 10/2014 |            |

OTHER PUBLICATIONS

Gul, Muhammet, et al. "A state of the art literature review of Vikor and its fuzzy extensions on applications." Applied Soft Computing, vol. 46, Sep. 2016, pp. 60-89, https://doi.org/10.1016/j.asoc.2016.04.040. (Year: 2016).*

Zhou X, Yu C, Yuan X, Luo C. A Matching Algorithm for Underwater Acoustic and Optical Images Based on Image Attribute Transfer and Local Features. Sensors (Basel). Oct. 24, 2021;21(21):7043. doi: 10.3390/s21217043. (Year: 2021).*

First Office Action issued in counterpart Chinese Patent Application No. 202210212066.1, dated Apr. 23, 2024.

Notification to Grant Patent Right for Invention issued in counterpart Chinese Patent Application No. 202210212066.1, dated Jun. 5, 2024.

* cited by examiner

POSITION LOCKING METHOD OF UNDERWATER EQUIPMENT, TERMINAL EQUIPMENT, SYSTEM AND NON-TRANSITORY MEDIUM

CROSS-REFERENCE TO RELATED APPLICATIONS

The present disclosure claims priority to Chinese Patent Application No. 202210212066.1, entitled "POSITION LOCKING METHOD OF UNDERWATER EQUIPMENT, TERMINAL EQUIPMENT, SYSTEM AND MEDIUM", filed on Mar. 4, 2022, which is incorporated herein as a reference in its entirety.

TECHNICAL FIELD

The present application relates to the technical field of image analysis, in particular to a position locking method of an underwater equipment, a terminal device, a system and a medium.

BACKGROUND

With the large-scale promotion of the application of underwater UAV in survey and patrol inspection, the use environment of underwater UAV is becoming more and more complex and changeable. Especially in rivers and offshore waters, there are characteristics such as large waves, rapidity and turbidity, which greatly increases the difficulty of UAV operation in turbid and undercurrent waters. As a result, it is difficult to ensure the imaging effect of underwater UAV only relying on optical lens, and as a result, the target cannot be identified and tracked accurately, which affects the effect of position locking function of UAV based on the underwater optical imaging technology.

SUMMARY

The main purpose of the present application is to provide a position locking method of an underwater equipment, a terminal device, a system and a medium, and to solve the problem of how to improve stability of a position locking of an underwater target object.

In order to achieve the above purpose, the present application discloses a position locking method of an underwater equipment, the position locking method of the underwater equipment is applied to a terminal equipment, the position locking method of the underwater equipment includes:
acquiring an optical image and a sonar image taken by the underwater equipment;
obtaining a target image by synthesizing the optical image and the sonar image, the target image including at least a target object;
determining position offset information of the target object according to the target image; and
generating position control parameters of the underwater equipment according to the position offset information, and sending the position control parameters to the underwater equipment to make the underwater equipment to lock a position according to the position control parameters.

In one embodiment, the determining the position offset information of the target object according to the target image includes:
determining an adjacent image of the target image at a current time, wherein the adjacent image is a target image at a previous time of the current time;
determining the position offset information of the target object according to the target image and the adjacent image.

In one embodiment, the determining the position offset information of the target object according to the target image and the adjacent image includes:
acquiring a first image region selected by a user in the target image, and determining first position information of the first image region;
acquiring a second image region selected by the user in the adjacent image, and determining second position information of the second image region; and
determining the position offset information of the target object according to the first position information and the second position information.

In one embodiment, the determining the position offset information of the target object according to the target image and the adjacent image includes:
identifying the target object in the target image and determining third position information of the target object;
identifying the target object in the adjacent image and determining fourth position information of the target object; and
determining the position offset information of the target object according to the third position information and the fourth position information.

In one embodiment, obtaining the target image by synthesizing the optical image and the sonar image includes:
inputting the optical image into a preset image enhancement model to obtain an optical enhanced image with a definition greater than that of the optical image; and
obtaining the target image by synthesizing the optical enhanced image and the sonar image.

In one embodiment, before the inputting the optical image into the preset image enhancement model to obtain the optical image, the position locking method of the underwater equipment further includes:
acquiring a training set including an underwater optical image and a reference image; and
training a preset neural network model according to the training set to obtain the image enhancement model.

In one embodiment, obtaining the target image by synthesizing the optical image and the sonar image includes:
determining a first image feature of the optical image and determining a second image feature of the sonar image; and
determining the target image according to preset weight coefficients, the first image feature and the second image feature.

To realize the above purpose, the present application provides a terminal device, a selection of the terminal device includes but not limited to a personal computer, an industrial computer, a mobile phone (Android, IOS), a tablet computer, etc. The terminal device includes a memory, a processor and a position locking program of an underwater equipment stored in the memory and executable by the processor. When the position locking program of the underwater equipment is executed by the processor, each operation of the position locking method of the underwater equipment according to the above is realized.

To realize the above purpose, the present application provides a position locking system of an underwater equipment. The position locking system of the underwater equipment includes an underwater equipment and the terminal device above, the terminal device is connected with the underwater equipment through a twisted pair, and the underwater equipment is provided with an optical camera and a sonar sensor.

To realize the purpose above, the present application provides a non-transitory computer-readable storage medium. The computer-readable storage medium stores a position locking program of an underwater equipment, when the position locking program of the underwater equipment is executed by a processor, each operation of the position locking method of the underwater equipment described above is realized.

The present application discloses a position locking method of an underwater equipment, a terminal equipment, a system and a medium, and acquires an optical image and a sonar image taken by an underwater equipment; obtains a target image by synthesizing the optical image and the sonar image, the target image including at least a target object; determines position offset information of the target object according to the target image; and generates position control parameters of the underwater equipment according to the position offset information, and sends the position control parameters to the underwater equipment to make the underwater equipment lock a position of the underwater equipment according to the position control parameters. By synthesizing the optical image and sonar image captured by the underwater equipment to form the target image, the image of the target object can be clearly obtained to avoid the unclear image caused by water pollution. The position offset information of the target object can be determined according to the target image, so that the underwater equipment can lock and maintain its position, making the underwater position locking stable, reliable and flexible, operation difficulty of underwater equipment in turbid or undercurrent water is greatly reduced.

The realization of the objective, functional features and advantages of the present application will be further described in combination with the embodiments and with reference to the accompanying drawings.

DETAILED DESCRIPTION OF THE EMBODIMENTS

It should be understood that the specific embodiments described here are only used to explain the present application and are not used to limit the present application.

The main solution of the embodiments of the present application is to:
acquire an optical image and a sonar image taken by an underwater equipment;
obtain a target image by synthesizing the optical image and the sonar image, the target image including at least a target object;
determine position offset information of the target object according to the target image; and
generate position control parameters of the underwater equipment according to the position offset information, and send the position control parameters to the underwater equipment to make the underwater equipment lock a position of the underwater equipment according to the position control parameters.

By synthesizing the optical image and sonar image captured by the underwater equipment to form the target image, the image of the target object can be clearly obtained to avoid the unclear image caused by water pollution. The position offset information of the target object can be determined according to the target image, so that the underwater equipment can lock and maintain its position, making the underwater position locking stable, reliable and flexible, operation difficulty of underwater equipment in turbid or undercurrent water is greatly reduced.

Figure 1:
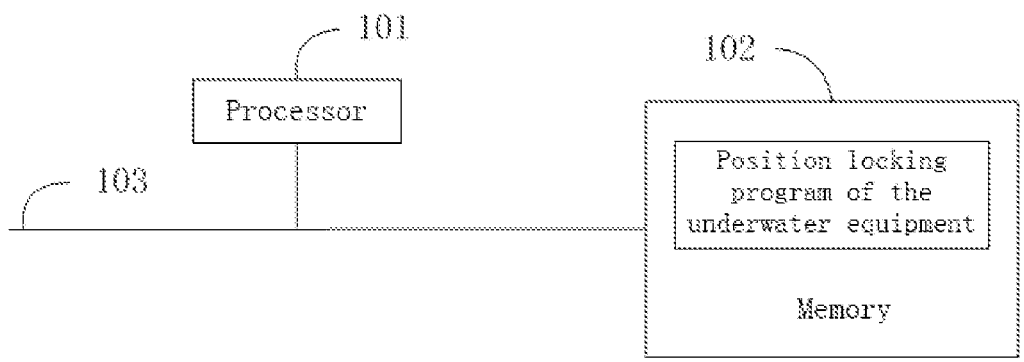
FIG. 1 is a hardware structure diagram of a terminal device according to an embodiment of the present application.

As an implementation scheme, the terminal device is shown in FIG. 1.

The embodiment of the present application relates to a terminal device, a selection of the terminal device includes but not limited to a personal computer, an industrial computer, a mobile phone (Android, IOS), a tablet computer, etc. The terminal device includes a processor 101, such as a CPU, a memory 102 and a communication bus 103. The communication bus 103 is configured to realize connection and communication between these components.

The memory 102 may be a high-speed RAM memory or a non volatile memory, such as a disk memory. According to FIG. 1, the memory 102, as a computer-readable storage medium, may include a position locking program of an underwater equipment. The processor 101 can be configured to call the position locking program of the underwater equipment stored in the memory 102 and perform the following operations:
acquiring an optical image and a sonar image taken by the underwater equipment;
obtaining a target image by synthesizing the optical image and the sonar image, the target image including at least a target object;
determining position offset information of the target object according to the target image;
generating position control parameters of the underwater equipment according to the position offset information, and sending the position control parameters to the underwater equipment to make the underwater equipment to lock a position according to the position control parameters.

In one embodiment, the processor 101 may be configured to call the position locking program of the underwater equipment stored in the memory 102 and perform the following operations:
determining an adjacent image of the target image at a current time, the adjacent image being a target image at a previous time relative to the current time;
determining the position offset information of the target object according to the target image and the adjacent image.

In one embodiment, the processor 101 may be configured to call the position locking program of the underwater equipment stored in the memory 102 and perform the following operations:

acquiring a first image region selected by a user in the target image, and determining first position information of the first image region;

acquiring a second image region selected by the user in the adjacent image, and determining second position information of the second image region;

determining the position offset information of the target object according to the first position information and the second position information.

In one embodiment, the processor 101 may be configured to call the position locking program of the underwater equipment stored in the memory 102 and perform the following operations:

identifying the target object in the target image and determining third position information of the target object;

identifying the target object in the adjacent image and determining fourth position information of the target object;

determining the position offset information of the target object according to the third position information and the fourth position information.

In one embodiment, the processor 101 may be configured to call the position locking program of the underwater equipment stored in the memory 102 and perform the following operations:

inputting the optical image into a preset image enhancement model to obtain an optical enhanced image with a definition greater than that of the optical image; and obtaining the target image by synthesizing the optical enhanced image and the sonar image.

In one embodiment, the processor 101 may be configured to call the position locking program of the underwater equipment stored in the memory 102 and perform the following operations:

acquiring a training set including an underwater optical image and a reference image;

training a preset neural network model according to the training set to obtain the image enhancement model.

In one embodiment, the processor 101 may be configured to call the position locking program of the underwater equipment stored in the memory 102 and perform the following operations:

determining a first image feature of the optical image and determining a second image feature of the sonar image;

determining the target image according to preset weight coefficients, the first image feature and the second image feature.

Based on the hardware architecture of the above terminal equipment, embodiments of a position locking method of an underwater equipment of the present application is proposed.

Figure 2:
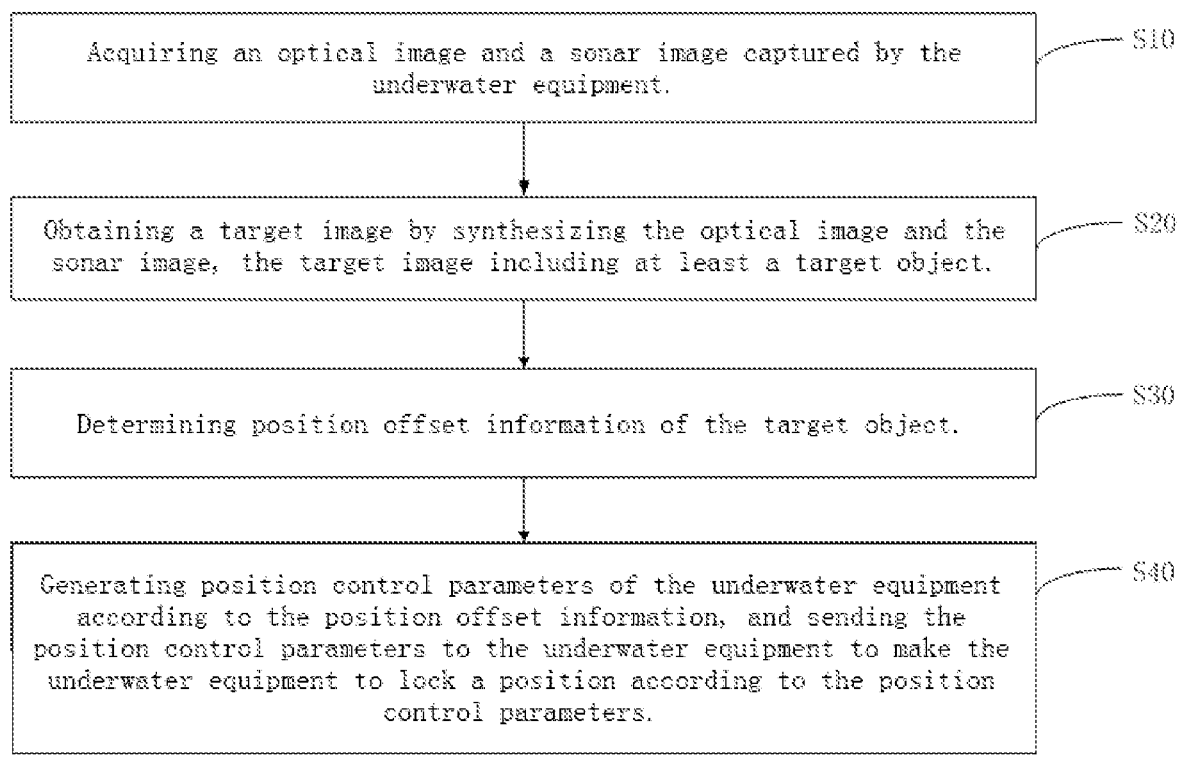
FIG. 2 is a flow diagram of a position locking method of an underwater equipment according to a first embodiment of the present application.

According to FIG. 2, FIG. 2 is a first embodiment of the position locking method of the underwater equipment of the present application. The position locking method of the underwater equipment includes the following operations:

S10, acquiring an optical image and a sonar image captured by the underwater equipment.

In an embodiment, the underwater equipment can be a remote operated vehicle (ROV). The ROV is a kind of unmanned underwater vehicle (UUV). According to FIG. 3, the underwater equipment B is provided with an optical camera D and a sonar sensor E. The optical camera D can capture optical images of an underwater target object C, and the sonar sensor E can acquire sonar images of the underwater target object C. The terminal device a can be a personal computer (PC), a mobile phone or a tablet computer. The terminal device a is located above the water. The terminal device a communicates with the underwater equipment B through a twisted pair F. The terminal device a can obtain the optical images and sonar images taken by the underwater equipment B. The optical images and sonar images are transmitted to the terminal device a above the water surface h in the form of encoded video stream through the twisted pair F. The optical images and the sonar images are in one-to-one correspondence. An optical image and a sonar image corresponding to the optical image are taken at the same time and/or at the same shooting angle.

S20, obtaining a target image by synthesizing the optical image and the sonar image, the target image including at least a target object.

In an embodiment, the target image at least includes a target object tracked by the underwater equipment. The target object is not limited to any object that will not move by itself, such as a stone, a pier or a sunken ship, and its underwater position is relatively fixed. The terminal device synthesizes the optical image and the corresponding sonar image to obtains the target image. Optionally, a first image feature of the optical image is determined. The first image feature includes at least an edge feature and a contour feature of the target object in the optical image. A second image feature of the sonar image is determined. The second image feature includes at least an edge feature and a contour feature of the target object in the sonar image. The target image is obtained according to preset weight coefficients, the first image feature and the second image feature, that is, the target image is generated according to the first image feature, a first weight coefficient corresponding to the first image feature, the second image feature and a second weight coefficient corresponding to the second image feature. Optionally, the second weight coefficient is greater than the first weight coefficient.

Optionally, the target image is obtained by synthesizing the optical image and the sonar image. The optical image is input into a preset image enhancement model to obtain an optical enhanced image. A definition of the optical enhanced image is greater than that of the optical image. The target image is obtained by synthesizing the optical enhanced image and the sonar image. Before the operation of input an initial optical image into the preset image enhancement model and obtaining the optical image, a training set is obtained. The training set includes underwater optical images and a reference image. The reference image is an optical image in the air; according to the training set, the preset neural network model is trained to obtain the image enhancement model.

S30, determining position offset information of the target object.

In an embodiment, the terminal device determines the position offset information of the target object. Optionally, the terminal device determines the position information of the target object in the target image at a current time, determines the position information of the target object in a target image at a previous time, and obtains the position offset information of the target object according to the position information of the target object at the two times.

S40, generating position control parameters of the underwater equipment according to the position offset information, and sending the position control parameters to the underwater equipment to make the underwater equipment to lock a position according to the position control parameters.

In an embodiment, the terminal device generates the position control parameters of the underwater equipment according to the position offset information of the target object, and sends the position control parameters to the underwater equipment. The underwater equipment adjusts an attitude of the underwater equipment according to the position control parameters to lock the position.

In the technical scheme of this embodiment, a selection of the terminal device includes but not limited to a personal computer, an industrial computer, a mobile phone (Android, IOS), a tablet computer, etc. The terminal device is to: acquire an optical image and a sonar image taken by the underwater equipment; obtain a target image by synthesizing the optical image and the sonar image, the target image including at least a target object; determine position offset information of the target object according to the target image; generate position control parameters of the underwater equipment according to the position offset information, and send the position control parameters to the underwater equipment to make the underwater equipment lock the position according to the position control parameters. By synthesizing the optical image and sonar image captured by the underwater equipment to form the target image, the image of the target object can be clearly obtained to avoid the unclear image caused by water pollution. The position offset information of the target object can be determined according to the target image, so that the underwater equipment can lock and maintain the position, making the underwater position locking stable, reliable and flexible, the operation difficulty of underwater equipment in turbid or undercurrent water is greatly reduced.

Figure 4:
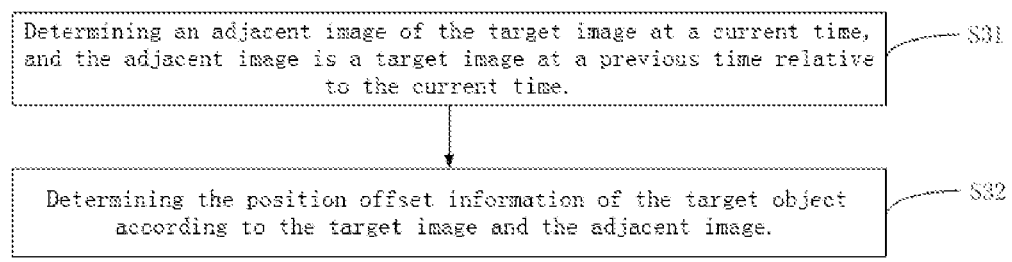
FIG. 4 is a detailed flow diagram of S30 of the position locking method of the underwater equipment according to a second embodiment of the present application.

According to FIG. 4, FIG. 4 is a second embodiment of the position locking method of the underwater equipment of the present application. Based on the first embodiment, S30 includes:

S31, determining an adjacent image of the target image at a current time, and the adjacent image is a target image at a previous time relative to the current time; and S32, determining the position offset information of the target object according to the target image and the adjacent image.

In an embodiment, the terminal device determines the adjacent image of the target image at the current time. The adjacent image is the target image at the previous time relative to the current time. The terminal device determines the position offset information of the target object according to the target image and the adjacent image. Optionally, the terminal device obtains a first image region selected by a user in the target image, and determines first position information of the first image region. For example, the user manually frames the target object in the target image through the touch screen of the terminal device, which will generate a rectangular box. The algorithm in the terminal device software will calculate the region of interest (ROI) of the rectangular box, and determine the position coordinate data of pixels in the rectangular box. The terminal device obtains a second image region selected by the user in the adjacent image, and determine the second position information of the second image region. For example, the user manually frames the target object in the adjacent image through the touch screen of the terminal device, and a rectangular box will be generated. The algorithm in the terminal device software will calculate the ROI (region of interest) of the rectangular box, and determine the position coordinate data of pixels in the rectangular box. The position offset information of the target object is determined according to the first position information and the second position information. Optionally, the target object in the target image is identified and third position information of the target object is determined.

A target object in an adjacent image is identified and fourth position information of the target object is determined. The position offset information of the target object is determined according to the third position information and the fourth position information.

In the technical scheme of this embodiment, the terminal device determines the adjacent image of the target image at the current time, and the adjacent image is a target image at a previous time of the current time. The position offset information of the target object is determined according to the target image and the adjacent image. The position offset information of the target object is determined through the target image and the adjacent image, so as to generate position control parameters to control the underwater equipment to lock the position.

The present application further discloses a terminal device, a selection of the terminal device includes but not limited to a personal computer, an industrial computer, a mobile phone (Android, IOS), a tablet computer, etc. The terminal device includes a memory, a processor and a position locking program of an underwater equipment stored in the memory and executable by the processor. When the position locking program of the underwater equipment is executed by the processor, each operation of the position locking method of the underwater equipment described in the above embodiments is realized.

Figure 3:
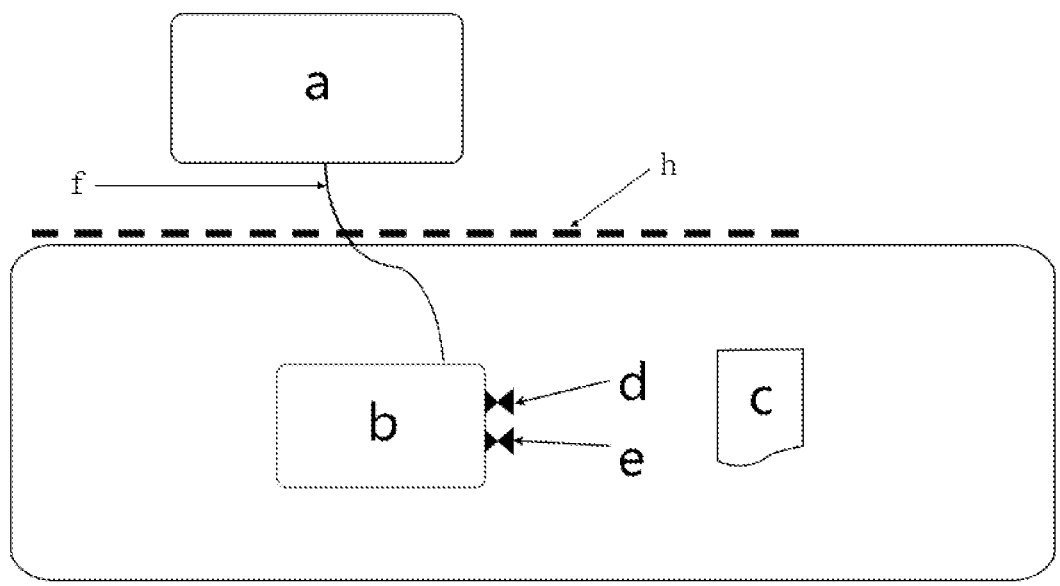
FIG. 3 is a structural diagram of a position locking system of an underwater equipment of the present application.

The present application further discloses a position locking system of an underwater equipment. Referring to FIG. 3, the position locking system of the underwater equipment includes an underwater equipment b and a terminal device a described in the above embodiment. The terminal device a is connected with the underwater equipment b through a twisted pair f. The underwater equipment b is provided with an optical camera d and a sonar sensor e.

The present application further discloses a non-transitory computer-readable storage medium which stores a position locking program of an underwater equipment. When the position locking program of the underwater equipment is executed by a processor, each operation of the position locking method of the underwater equipment described in the above embodiment is realized.

The above serial number of the embodiments of the present application is only for description and does not represent the advantages and disadvantages of the embodiments.

It should be noted that in this context, the term "including", "including" or any other variation thereof is intended to cover non exclusive inclusion, so that a process, system, article or device that includes a series of elements includes not only those elements, but also other elements not explicitly listed, or elements inherent in such a process, system, article or device. Without further restrictions, the element defined by the statement "including a . . . " does not exclude the existence of other identical elements in the process, system, article or device that includes the element.

Through the description of the above embodiments, those skilled in the art can clearly understand that the system of the above embodiments can be implemented by means of software plus the necessary general hardware platform. Of course, it can further be implemented by hardware, but in many cases, the former is Preferred. Based on this understanding, the technical solution of the present application, in essence or the part that contributes to the prior art, can be embodied in the form of a software product, which is stored in a computer-readable storage medium (such as ROM/RAM, magnetic disc, optical disc) as described above, It includes several instructions to enable a terminal device (which includes but not limited to a mobile phone, a computer, a parking management device, an air conditioner, or a network device, etc.) to execute the system described in each embodiment of the present application.

The above is only the preferred embodiment of the present application, and does not limit the patent scope of the present application. Any equivalent structure or equivalent process transformation made by using the contents of the description and drawings of the present application, or any direct or indirect application applied in other relevant technical fields, are similarly included in the patent protection scope of the present application.

What is claimed is:

1. A position locking method of an underwater equipment, wherein the position locking method of the underwater equipment is applied to a terminal equipment, the position locking method of the underwater equipment comprises:
    acquiring an optical image and a sonar image taken by the underwater equipment;
    obtaining a target image by synthesizing the optical image and the sonar image, the target image comprising at least a target object;
    determining position offset information of the target object according to the target image; and
    generating position control parameters of the underwater equipment according to the position offset information, and sending the position control parameters to the underwater equipment to make the underwater equipment to lock a position according to the position control parameters;
    wherein the obtaining the target image by synthesizing the optical image and the sonar image comprises:
    determining a first image feature of the optical image and determining a second image feature of the sonar image; and
    determining the target image according to the first image feature, a first weight coefficient corresponding to the first image feature, the second image feature and a second weight coefficient corresponding to the second image feature;
    wherein the second weight coefficient is greater than the first weight coefficient.

2. The position locking method of the underwater equipment according to claim 1, wherein the determining the position offset information of the target object according to the target image comprises:
    determining an adjacent image of the target image at a current time, wherein the adjacent image is a target image at a previous time of the current time; and
    determining the position offset information of the target object according to the target image and the adjacent image.

3. The position locking method of the underwater equipment according to claim 2, wherein the determining the position offset information of the target object according to the target image and the adjacent image comprises:
    acquiring a first image region selected by a user in the target image, and determining first position information of the first image region;
    acquiring a second image region selected by the user in the adjacent image, and determining second position information of the second image region; and
    determining the position offset information of the target object according to the first position information and the second position information.

4. The position locking method of the underwater equipment according to claim 3, wherein the determining the position offset information of the target object according to the target image and the adjacent image comprises:
    identifying the target object in the target image and determining third position information of the target object;
    identifying the target object in the adjacent image and determining fourth position information of the target object; and
    determining the position offset information of the target object according to the third position information and the fourth position information.

5. The position locking method of the underwater equipment according to claim 1, wherein the obtaining the target image by synthesizing the optical image and the sonar image comprises:
    inputting the optical image into a preset image enhancement model to obtain an optical enhanced image with a definition greater than that of the optical image; and
    obtaining the target image by synthesizing the optical enhanced image and the sonar image.

6. The position locking method of the underwater equipment according to claim 5, wherein before the inputting the optical image into the preset image enhancement model to obtain the optical enhanced image, the position locking method of the underwater equipment further comprises:
    acquiring a training set comprising an underwater optical image and a reference image; and
    training a preset neural network model according to the training set to obtain the image enhancement model.

* * * * *